United States Patent [19]

Queneau et al.

[11] 3,990,889

[45] *Nov. 9, 1976

[54] METALLURGICAL PROCESS USING OXYGEN

[75] Inventors: Paul E. Queneau, Cornish, N.H.; Reinhardt Schuhmann, Jr., West Lafayette, Ind.

[73] Assignee: Q-S Oxygen Processes, Inc., Portland, Maine

[ * ] Notice: The portion of the term of this patent subsequent to Mar. 2, 1993, has been disclaimed.

[22] Filed: Sept. 29, 1975

[21] Appl. No.: 617,373

Related U.S. Application Data

[63] Continuation of Ser. No. 357,012, May 3, 1973, Pat. No. 3,941,587.

[52] U.S. Cl. ...................... 75/74; 75/72; 75/76
[51] Int. Cl.$^2$ ......................... C22B 15/00
[58] Field of Search ............... 75/74, 72, 76, 75

[56] References Cited
UNITED STATES PATENTS

| | | | |
|---|---|---|---|
| 3,326,672 | 6/1967 | Worner | 75/75 |
| 3,832,163 | 8/1974 | Themelis et al. | 75/74 |

*Primary Examiner*—Walter R. Satterfield

[57] ABSTRACT

A continuous autogenous multi-stage process for converting non-ferrous metal sulfides, in an oscillating, elongated, gently sloped, sealed, tiltable, rounded cross-section furnace, discharging crude metal or low-iron matte at one end, and silicate slag and sulfur dioxide-rich gas at the other end. The concentrates, fluxes, commercial oxygen, sulfur dioxide, a carbonaceous reducing agent and optionally other materials are introduced into the furnace in stages to provide a molten bath of slag and matte flowing countercurrently. Slag scavenging is accomplished by deconverting to produce low grade, cleansing matte in situ in the slag layer, followed by settling. At least a substantial proportion of the commercial oxygen is continuously blown in through injectors extending through the refractory lining of the vessel and communicating with its interior below the bath surface, where necessary with a protective fluid, desirably surrounding the oxygen. Oscillation of the converter causes the injected gases to sweep back and forth through the bath, and distributes the solids over its surface to provide bath turbulence and interphase contact. Offgases are desirably recycled. Flexible control means and special apparatus are disclosed.

1 Claim, 3 Drawing Figures

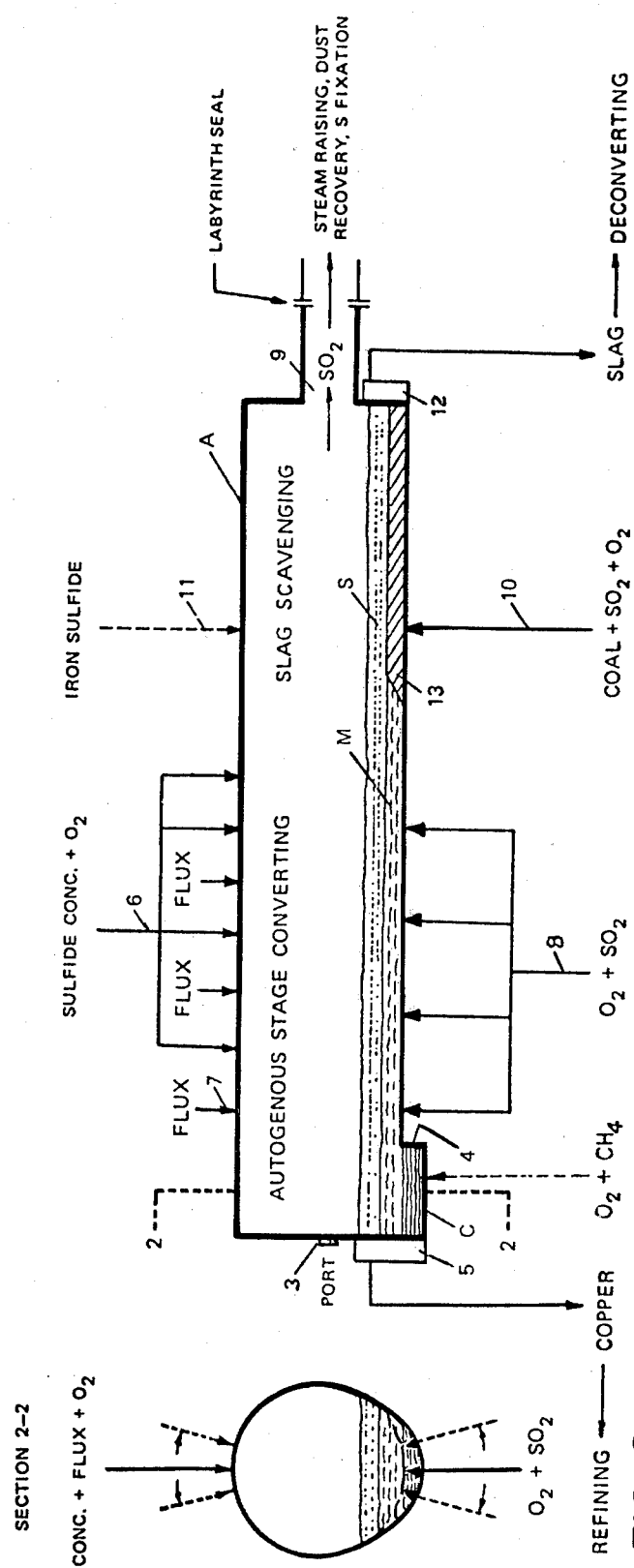

METALLURGICAL PROCESS USING OXYGEN

This is a continuation of application Ser. No. 357,012, filed May 3, 1973, now U.S. Pat. No. 3,941,587.

BACKGROUND OF THE INVENTION

1. Field of the Invention

This invention relates to a converting process for the extraction of heavy non-ferrous metals from their ores and to apparatus.

It has preferred reference to the continuous converting of copper, nickel, cobalt or lead sulfides.

2. Description of the Prior Art

The continuous smelting and converting of sulfide minerals to matte or metal is an old concept well known in the art. As long ago as 1898, Garretson in U.S. Pat. No. 596,992 disclosed a three zone smelting, converting and slag settling procedure. He teaches a method for the continuous production of non-ferrous metals from their sulfide ores comprising the steps of continuous smelting of the sulfides in a fuel burning furnace with a long narrow slightly sloped bottom; the resulting matte flows continuously to one or more separate, but communicating, converters in series at one end of the furnace; there the matte is progressively and continuously blown to metal which is withdrawn; the resulting rich slag flows back continuously — countercurrently to the matte — through the smelting furnace, is impoverished by contact with the low grade matte therein, flows into a separate but communicating, slag settling zone at the other end of the furnace, and is there subjected to the heating and reducing action of charcoal; matte settles out and flows back to the furnace; and the cleaned slag is discharged.

The concept of the autogenous production of copper matte from sulfide minerals was disclosed in 1915 by Klepinger et al in U.S. Pat. No. 1,164,653. He teaches the spraying of dry, finely divided copper sulfide concentrates with preheated air into a reverberatory-type furnace. The concept of slag cleaning by the washing and reducing action of iron sulfide was disclosed by Stout in U.S. Pat. Nos. 1,416,262 (1922) and 1,544,048 (1925). He teaches progressive cleaning of molten copper-containing slags by their agitation and thorough mixing with pyrite, low grade matte or iron, followed by slag settling under quiescent conditions. Gronningsaeter disclosed in U.S. Pat. No. 2,426,607 (1947) apparatus for reacting slags to recover metals from them by subjecting the slags to reduction and mixing by injection of fuel and air through tuyeres into the body of the slags.

The concept of an elongated, slightly inclined, rotary furnace sufficiently long to provide substantially separate, continuous metal melting and refining zones was disclosed by Sherwood in 1970 in U.S. Pat. No. 3,542,350. Much information pertinent to non-ferrous pyrometallurgy is furnished in many of the Reports of Investigation of the U.S. Bureau of Mines, e.g., "Autogenous Smelting of Copper Sulfide Concentrate", R. I. 7705 (1973).

One of the present applicants disclosed in 1954, U.S. Pat. No. 2,668,107, autogenous smelting of copper and nickel sulfide concentrates by injecting dry sulfides with tonnage oxygen and flux into an impermeably encased chamber. Matte or metal and slag are continuously produced, the matte or metal is discharged from one end of the furnace, and the slag is discharged from the other end. The rich slag from the high grade matte end of the furnace is depleted of its metal values by employing the principle of countercurrent flow of matte or metal relative to the slag. If desired, after passage over a raised hearth barrier to separate the slag and matte layers, and, in any event, prior to discharge from the furnace, the slag is given a final cleaning by washing it with a shower of molten, low grade matte droplets rich in iron sulfide. Furnace off-gas contains a high concentration of sulfur dioxide. He also disclosed in 1961, U.S. Pat. No. 3,004,846 and in subsequent U.S. Pat. Nos. 3,030,201; 3,069,254; 3,468,629; 3,516,818; 3,615,361 and 3,615,362 the conversion of copper, nickel and lead sulfide materials to metal, in appropriately operated top-blown rotary oxygen converters. He teaches top blowing techniques using downwardly directed gas lances to impinge process gases of controlled analysis onto or through the surface of the bath at controlled temperatures. He also teaches the need for "a sufficiently high degree of agitation to provide efficient and effective gas-solid-liquid contact throughout the bath, which is conducive to efficient elimination of iron, sulfur and impurities" and he emphasizes "the extreme importance and necessity connected with strong induced turbulence of the furnace bath". Application of his turbulent bath principle "enhances heat transfer, increases the overall rate of the chemical reactions, minimizes compositional gradients within each phase and significantly reduces diffusion barriers between the slag and the sulfide phase".

In a 1950 publication "A Survey of the Thermodynamics of Copper Smelting" (Transactions AIME, Volume 188) one of the present applicants presented an analysis of the physical chemistry involved in the smelting and converting of mixtures of copper and iron sulfides to produce crude metal and waste slag. A major teaching is that "the chemical activities of oxygen and sulfur are two of the most important thermodynamic yardsticks to be applied to copper smelting processes". The publication also includes quantitative demonstrations that the production of crude metal and waste slag from sulfide concentrate should be regarded as a process of "progressive and controlled oxidation" in a "sequence of steps". Thermodynamic calculations provide numerical estimates of the oxygen and sulfur activities which prevail in conventional copper smelting, converting and fire refining operations. The publication discloses that the matte-slag systems characteristic of these operations are subject to "tremendous variation in oxygen pressure", as much as $10^6$-fold. He teaches that these variations can be related to the practical problems of controlling matte and slag stoichiometry, operating temperatures, magnetite formation and slag losses. His subsequent publications disclose oxygen and sulfur activities in mattes and slags over the wide ranges of composition and temperature encountered in the smelting and converting of copper- and iron-containing sulfides.

During the past several years a number of skilled and forward-looking investigators have proposed a variety of ways and means for solving the serious problems connected with pyrometallurgical transformation of sulfide concentrates to metal in a continuous process. These include Worner, U.S. Pat. No. 3,326,671 (1967), Themelis et al, U.S. Pat. No. 3,542,352 (1970), Maelzer et al, U.S. Pat. No. 3,687,656 (1972), and Morisaki et al of Mitsubishi Metal Corporation.

Despite their efforts none have satisfactorily overcome all of the crucial obstacles involved. In the first of these patents, operating complications and limitations are imposed by the three zone concept in the type of apparatus employed and by the reliance on top blowing techniques using downwardly directed gas lances. The second procedure utilizes concurrent flow of matte and slag. The white metal blowing section — where high oxygen and low iron sulfide activities are essential — is contiguous to the slag reducing section — where low oxygen and high iron sulfide activities are essential. The process has some of the restrictions characterizing current industrial operations because of the similarity of the apparatus employed to a conventional Pierce-Smith converter. The third patent describes a semi-continuous series of intricate operations in a multi-compartment apparatus, which include top blowing techniques using downwardly directed gas lances. The fourth procedure employs three separate, but communicating, individual furnaces for continuous smelting, converting and slag cleaning; it also relies on top blowing techniques using downwardly directed gas lances. This process retains several disadvantages of the established art.

SUMMARY OF THE INVENTION

It is an aim of the present invention to provide means of avoiding disadvantages of the prior art procedures and to provide positive economic and environmental advantages as will be described.

A preferred embodiment of the present invention involves a continuous, autogenous, multi-stage, countercurrent process for converting copper or nickel sulfide concentrates and fluxes to crude metal or low-iron matte, waste slag and sulfur dioxide. The converting reactions are disposed stage-wise along the length of a slowly oscillating, elongated, gently sloped, rounded cross-section sealed furnace of a simple and symmetrical configuration, discharging crude metal or low iron matte at one end, and silicate slag impoverished in metal values and sulfur dioxide-rich gas at the other end; with staged introduction of sulfide concentrates, fluxes, commercial oxygen, sulfur dioxide, water, a carbonaceous reducing agent and iron sulfide at intermediate points along its length. The staged introduction of feed materials establishes the conditions essential for progressive oxidation along the length of the converter. Near the crude metal or low-iron matte discharge end, the activity of oxygen in the molten bath reaches a maximum sufficiently high to insure satisfactorily low residual iron content in the value metal product; near the slag discharge end, activity of oxygen in the molten bath is brought to a minimum by introducing sulfur dioxide with a carbonaceous material, which reagents react with ferrous oxide in the slag to reverse the converting reaction so as to form, in situ, a cleansing nascent non-ferrous metal bearing iron sulfide.

A substantial proportion of the commercial oxygen is blown into the furnace through injectors extending through the refractory lining of the furnace and having openings communicating with the interior of the furnace beneath the surface of the liquid. The injector nozzles and refractory are protected during the introduction of the oxygen into the molten metal, by injecting along with the oxygen, protective fluids, either mixed with the oxygen or surrounding the oxygen streams. The injection of gas-protected converting oxygen, directed upwardly into the molten matte bath, through the refractory wall and below the liquid surface, minimizes slag, dust, refractory and other difficulties such as those caused by reliance on top blowing techniques using downwardly directed gas lances and provides unique capabilities for practical achievement of a multi-stage, progressive converting process; and the preferred vessel designed to exploit these capabilities provides highly flexible means for control of the chemical and physical environments necessary for efficient staging of the operations along the length of the apparatus.

Oscillation of the converter causes the injected gases to sweep back and forth through the molten bath, eliminates stagnant zones and distributes the sulfide concentrates and fluxes over the surface of the bath, and thereby imparts the controlled bath turbulence and intimate interphase contact required for effective approach to equilibrium stage separation. Furnace oscillation also promotes positive matte flow, decreases refractory degradation and increases injector nozzle life.

Control of temperature, oxygen potential and metal sulfide activity gradients along the length of the converter is readily and straightforwardly accomplished, by adjusting and proportioning the flow rates of sulfide concentrates, oxygen, sulfur dioxide, water, coal or other feed materials such as a hydrocarbon gas at their several points of entry. No fuel-fired smelting zone is required with its attendant disadvantages, because melting of the sulfide concentrates and fluxes is accomplished incidental to converting, utilizing the heat generated by the chemical reactions. Melting of the sulfide concentrates and fluxes may be largely accomplished by partial flash oxidation of the sulfides in the atmosphere above the molten bath. No refining zone is required because the object is to produce only crude metal or low iron matte, suitable as feed material for refining or other processing steps. The invention broadens the ranges of oxygen and metal sulfide activities characteristic of the prior art; it normally includes the controlled reversal of the converting reactions so as to apply deconverting to the extent required for slag scavenging purposes.

Another advantageous feature of this preferred embodiment of the invention is the use of recirculated sulfur dioxide — preferably recirculated furnace off-gas — for protection of the oxygen injectors and refractories, for furnace temperature control and for heat recuperation, for chemical reaction control in — and physical agitation of — the bath and for deconverting, all while maintaining a high sulfur dioxide content in the furnace off-gas. Sulfur dioxide has a significantly higher heat capacity and density than nitrogen, and does not contaminate furnace off-gas.

The invention is also embodied in preferred apparatus for carrying out the process. This apparatus includes an elongated, gently sloped, oscillable, rounded cross-section sealed furnace having discharge means at one end for a non-ferrous metal-rich phase and discharge means at the other for slag and a discharge for off-gases at the slag discharge end. The sealing of the converter is important to prevent air ingress and/or sulfur dioxide leakage. The vessel is sloped at less than 5° downwardly towards the metal-rich product discharge end and its bottom is stepped to provide a pool or reservoir at one end for the metal-rich product and toward the other end for slag separation. Means are provided for feeding concentrates and flux optionally with oxygen through the top onto the surface of the bath. Injectors extend through the refractory lining of the furnace through openings communicating with the interior of the furnace beneath the surface of the liquid. The injectors are equipped for blowing a protective gas during the introduction of the oxygen into the molten metal, along with the oxygen so as to protect the injectors and the surrounding refractories. There is means for oscillating the furnace slowing, e.g. through 20° to 40° and at 1 to 6 reciprocations per minute and for tilting it, e.g. through 75° for servicing the injectors. All feed and discharge connections are such that they permit this oscillation and tilting. Suitable means are provided for metering, regulating, and analyzing the feed and product materials to effect appropriate control as described herein.

Other features of the invention are furnished in the detailed description below.

BRIEF DESCRIPTION OF THE DRAWINGS

The accompanying drawings illustrate preferred embodiments of the invention. In the drawings:

FIG. 1 is a schematic diagram showing an elongated kiln-like vessel, of preferred configuration, in which the treatment of the invention may be carried out;

FIG. 2 is a vertical cross-section along the line 2—2 of FIG. 1; and

DESCRIPTION OF THE PREFERRED EMBODIMENTS

Figure 3:
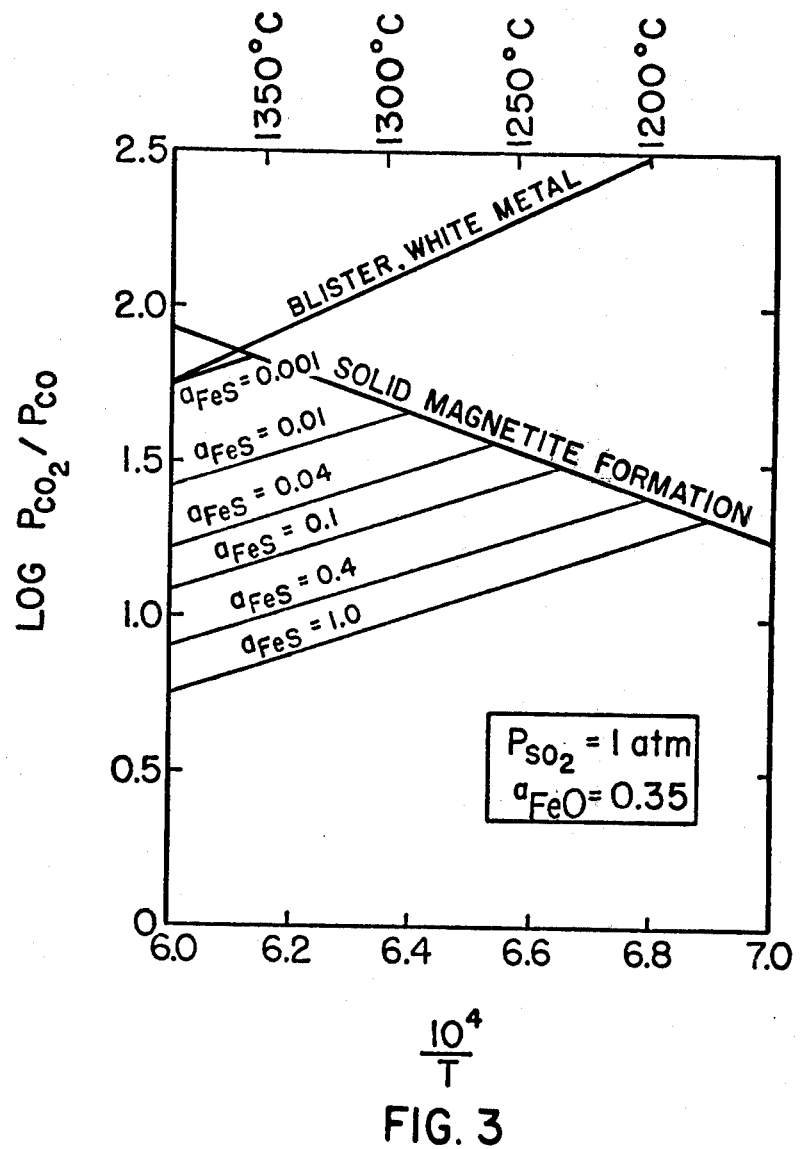
FIG. 3 is an equilibrium diagram which illustrates desirable relationships between physical-chemical variables in the preferred sequential converting process of the invention.

Referring more particularly to FIG. 1, a preferred treatment vessel is shown in the form of an elongated, gently sloped, rounded cross-section sealed furnace A which serves as a trough for a molten bath. The vessel is provided internally with a refractory lining which is stepped inwards at 13 and the vessel is stepped outwards as at 4. An intermediate step may be included if required. The furnace walls may have heat exchangers, e.g. steam tubes; evaporative air cooling tubes; water jackets; to suit the process conditions. Suitable mechanisms are provided for introducing feed, e.g. sulfide materials and fluids. Introducing the sulfide materials above the surface of the molten bath avoids the refractory degradation and other difficulties which result from their introduction beneath the surface.

The vessel A is mounted for oscillation about its longitudinal axis, for example, through about 30° and is tiltable, for example, through about 75° to permit maintenance, for example, of the injectors.

With the process in operation the molten bath will layer out into a matte M, a slag and a pool of crude molten copper C.

Copper sulfide concentrates and oxygen are mixed and introduced in staged ratios through several inlets, e.g., vortex sprayers, at 6, with minimal oxygen introduction at the entry closest to the slag scavenging operation, and flux is introduced through inlets as at 7, into the atmosphere above the molten bath. Oxygen, shielded by sulfur dioxide, is blown into the converter A below the matte-slag interface through the several injectors at 8 extending through the refractory lining of the vessel. The staged injection of oxygen at 8 progressively oxidizes the matte as it flows toward the copper discharge end, with formation of increasingly copper-rich matte and finally crude copper. Simultaneously, the iron silicate slag formed flows countercurrently toard the slag discharge end. The sulfur dioxide-rich gas evolved passes concurrently over the slag on its way to the gas outlet 9 equipped with a labyrinth seal.

Through the injector 10 there is introduced beneath the surface of the slag; coal, sulfur dioxide, and oxygen in amounts sufficient to establish strongly reducing conditions and bath turbulence. The resulting deconverting reaction scavenges the slag by formation of cupriferous iron sulfide in situ. Simultaneously, the slag is optionally washed with a finely divided iron sulfide introduced, preferably as a shower, at the inlet 11 which further depletes the slag of its copper content. Finally the slag flow slowly through a calm pool to the slag discharge 12. The low grade matte which settles out of the slag flows countercurrently toward the copper discharge end.

As the procedure described is taking place, the reactor is oscillated slowly through 30° at three reciprocations per minute. The oscillation increases gas-liquid-solid contact for effective heat and means transfer.

The injection of the commercial oxygen, sulfur dioxide and other gases as the reactor is reciprocated causes these gases to enter the molten bath at continuously different angles to its surface and thus reaches constantly changing parts of the bath, with resultant turbulence of both chemical and physical origin. Simultaneously, the copper-rich matte fraction flows towards the copper discharge end and the iron silicate-rich slag fraction towards the slag discharge end, so that in the longitudinal direction fresh bath is being continuously subjected to advantageous gas-liquid and liquid-liquid contact.

Also, as the reactor is reciprocated back and forth the concentrates and flux are fed into the atmosphere above the surface of the bath. Because the position of the feed entries is changing continuously with respect to the surface of the bath, the solids are distributed across its surface. Also, since the atmosphere above the bath is flowing towards the slag discharge end, the concentrates and flux fed are moving through the atmosphere transversely to its flow bringing about advantageous gas-solid contact. In sum, intimate interphase contact is achieved, bringing efficient conversion of the concentrates to crude copper, low copper-containing slag and sulfur dioxide-rich gas.

The process may be started by first slowly heat soaking the refractories to about 1300° C by the use of a fuel burner at port 3. Then concentrates may be introduced, e.g. partially flash converted for the time required to build up a shallow bath, maintaining enough gas flow, e.g. sulfur dioxide, through the injectors, to protect them, followed by normal operation of the converter. Alternatively, after refractory heat-soaking, matte may be poured into the furnace, followed by normal operation.

The reaction is autogenous and the operating temperature is maintained by the exothermic reaction, within a range effective to keep the metal and slag satisfactorily fluid and maintain high reaction rates, for example, within the range from about 1000° C to about 1650° C. Preferably the oxidizing conditions will vary progressively and sequentially within the converting region.

PROCESS CONTROL

Some of the qualitative aspects of the metallurgical control of a continuous converter will be apparent to those skilled in standard batch converting. However, the continuous process embodied in this invention provides, in addition, a number of highly flexible operating controls which are used in concert to establish and maintain a steady state of staged converting providing optimum metallurgical performance for wide ranges of compositions of sulfide concentrates and converter products. Primary stoichiometric control is based on metering and proportioning the total feed rates of sulfide concentrates, fluxes, and oxygen to obtain continuous production of a crude metal or low-iron matte product, a waste slag carrying substantially all the iron along with a sufficiently high content of silica and other fluxing oxides to give desirable slag properties, and an $SO_2$-rich effluent gas containing a small excess of oxygen. Short-term fluctuations in the chemical compositions and converting behavior of the solid feed materials, or other divergences from the desired steady state proportioning of the total input materials will be absorbed by accumulation or depletion of the matte and/or metal layers in the converter, these layers thus serving as a large stabilizing reservoir within the furnace. Accordingly, stoichiometric control of the ratio of total oxygen input to total input of sulfide concentrates is facilitated by appropriate monitoring of the depth of the matte layer in the apparatus.

The distributions of oxygen inputs and sulfide concentrate inputs among their respective points of feeding along the length of the converter are regulated, as already mentioned, to establish the appropriate gradients of chemical conditions along the converter. More specifically, the ratio of oxygen to sulfides is at a minimum near the slag scavenging section with much less oxygen being fed than required to fully convert the sulfides being added in that section. A convenient practical criterion for making these adjustments is the ratio of ferric iron to total iron in the slag, which is determined by slag sampling and analysis. The optimum range for a given operation is established by trial, but a typical range in converting copper sulfide concentrates at 1300° is from a ferric iron: total iron ratio of 0.2 or higher at the metal discharge end down to 0.06 at the waste slag discharge end.

In the slag scavening section, the quantities of iron sulfide, coal, $SO_2$, and $O_2$ are adjusted to cause the continuous formation, within the slag layer, of low grade matte, e.g. less than 20 percent Cu, which settles through the slag and cleans the value metal from the slag to a low level before the slag is discharged from the furnace. The oxygen injected with the coal provides partial combustion of the coal, for formation of a hot, strongly reducing gas and localized heating to meet thermal requirements of the deconverting reactions. As already pointed out, the ratio of ferric iron to total iron provides a useful operating criterion for guidance in the adjustments of input materials into the slag scavenging stage and this ratio preferably is brought substantially to a minimum by such adjustments.

A wide range of temperature control is available to the operator, independently of the proportioning of oxygen and sulfide, by varying the quantity of the recirculated $SO_2$. Further flexibility is available, as needed, by the use of water or by the substitution of hydrocarbon shielding fluids for $SO_2$ or by varying the temperature of the $SO_2$. Through all these means, the operator can readily control the temperature, at high level, throughout the converter, e.g. so that the fluid high silica slag needed for rapid reaction and clean separation is achieved, without localized overheating and resulting excessive erosion of injectors and refractories.

The various product streams are monitored continuously, using on-stream or rapid analysis instrumentation. Also, the temperatures are continuously determined along the length of the converter.

When fixation of all the sulfur in the converter off-gas —for instance mainly as elemental sulfur —cannot be justified, the applicants' preferred alternative is to treat the gas by what they term "deconverting". In this operation, carried out in a separate apparatus, the $SO_2$-rich off-gas is injected, together with carbonaceous reducing agent and commercial oxygen, into the molten waste iron silicate slag from the converter so as to fix most of the sulfur in the gas as liquid iron sulfide. This may be cast and stockpiled to conserve both the sulfur from the gas and the iron from the slag for future consumption. A fraction of the liquid iron sulfide may be granulated in water and recycled to the converter for slag cleaning purposes. If it is desired to fix substantially all of the sulfur in this form, additional iron required can be supplied by feeding the deconverting furnace any suitable iron source material, e.g. scrap such as junk automobiles, or other slags. Judicious amounts of lime can, of course, be employed to maintain slag fluidity.

Sulfur fixation in this matter represents an extension of the slag cleaning procedure utilized in the continuous oxygen converter, and thus can be carried out in a continuously operating furnace of quite similar design, with appropriate injection of oxygen, sulfur dioxide, and carbonaceous reducing agent. Those skilled in the art will recognize that deconverting, using $SO_2$-rich gas, can also be carried out in other apparatus, quite similar to the water-jacketed slag fuming furnaces commonly used in treating slags, with pulverized coal and air mixtures, for other purposes, e.g. zinc recovery.

PHYSICAL-CHEMICAL VARIABLES

The equilibrium diagram of FIG. 3 illustrates the relationship among some of the most important physical-chemical variables at various stages of the applicants' sequential copper converting process. Following common practice among chemical metallurgists, the oxygen activity is measured by log ($P_{CO}/P_{CO}$), and the temperature is measured by the reciprocal of absolute temperature. The minimum oxygen activity required to form metallic copper from white metal copper sulfide, at a given temperature, is shown by the line at the top of the Figure. If an iron silicate slag with FeO activity ($a_{FeO}$) equal to 0.35 is present, on the other hand, the oxygen activity at a given temperature must be kept below the line corresponding to solid magnetite formation. The succession of lines for different values of iron sulfide activity correspond to successive stages of converting, because the copper content of the matte increases as the activity of iron sulfide decreases. The conditions corresponding to low grade mattes and to low metal contents in the waste slag lie just above the line for $a_{FeS}$ equal to 1.0.

FIG. 3 also depicts the reversibility of the principal converting reaction:

$$FeS \text{ (matte)} + 3/2O_2 \text{ (gas)} \rightarrow FeO \text{ (slag)} + SO_2 \text{ (gas)}$$

If the oxygen activity is maintained below the line for $a_{FeS}$ equal to 1 — by using an appropriate reducing agent — then $SO_2$ gas at atmospheric pressure will react with the FeO and copper, nickel and cobalt oxides, in the slag, to form a non-ferrous metal-bearing iron sulfide, the reverse of the usual converting reaction. It seems appropriate, therefore, as has been done in this disclosure, to term these reactions "deconverting".

Examples of deconverting reactions, utilizing carbonaceous reducing agents and sulfur dioxide are as follows:

$$SO_2 + FeO \text{ (slag)} + 3C \rightarrow FeS \text{ (matte)} + 3CO$$
$$SO_2 + FeO \text{ (slag)} + 3C \rightarrow FeS \text{ (matte)} + 3CO_2$$
$$SO_2 + Cu_2O \text{ (slag)} + 3C \rightarrow Cu_2S \text{ (matte)} + 3CO$$

To achieve the low levels of slag oxygen activity required for deconverting, it is necessary to reduce slag ferric oxide content to a relatively low level by use of a reducing agent. For example, if at 135° C a slag oxygen activity equivalent to log ($P_{CO_2}/P_{CO}$) of 0.5 is desired — so as to be below the line for $a_{FeS} = 1$ in FIG. 3 — the proportion of ferric iron present must be less than 6 percent of the total iron content of the slag.

Thus, a major achievement of the present invention has been to provide a process embodying a progressive and controlled sequence of oxygen and other activities, ranging in a systematic fashion from the high oxygen activity necessary to oxidize the great bulk of the iron and sulfur in the feed so as to discharge a product high in metal value at one end of the converter, down to the low oxygen activity required at the other end of the vessel to discharge a slag low in metal values.

For the specific conditions represented in FIG. 3 and for an operating temperature of approximately 1600° Kelvin (1327° C), the general range of oxygen activities to be established and controlled is from a $CO_2/CO$ ratio of about 100:1 down to a $CO_2/CO$ ratio of about 5:1, corresponding to a 400fold range in activity of $O_2$. In order to achieve such a range of oxygen activities in a continuous, substantially steady state reactor, it is necessary to supply oxygen at a pressure above that corresponding to $CO_2/CO = 100$ and to provide a reducing agent capable of lowering the $CO_2/CO$ ratio below 5. Thus, when all process needs are taken into account, in the case of copper concentrate treatment, full realization of the thermodynamic process model requires positive and effective control of oxygen activity over as much as a 1000-fold range.

The thermodynamic feasibility of an equilibrium model, though an essential requirement, is, of course, not sufficient to demonstrate the feasibility of a large scale continuous pyrometallurgical process. The applicants' design is also based on stoichiometric and thermal balances among the interacting streams of solids, liquids, and gases flowing through the system. Appropriate residence times and fluid flow conditions have been provided to achieve the necessary heat and mass transfer. The applicants' apparatus also has the physical configurations and capabilities needed to meet process requirements efficiently including control of essential operating variables. Thus, the converter can be designed for a very high capacity, adequate for single unit treatment of several thousand tons of solid charge daily. Important information relevant to these considerations is available in the technical books written or edited by the applicants' over the past 2 decades. The applicants' appreciation of the difficulties and shortcomings of existing pyrometallurgical practices, and their study of the attempts of others to solve these problems has led to the improvements over the prior art detailed in this disclosure.

PARTICULAR CONCENTRATES

The concentrates treated are those which contain enough iron and sulfur to be substantially autogenous when reacted with oxygen-rich gas. Typical analyses are contained in the following examples. The invention also contemplates that some or all of the sulfide feed material may be pelletized wet concentrate, e.g. 8 percent free moisture, or even a concentrate slurry with water, e.g. 75 percent solids.

The invention is particularly useful in the recovery of nickel and cobalt from pentlandite concentrates. The concentrates are treated in the applicants' continuous oxygen converter for production of matte containing a large proportion of the nickel and cobalt in the concentrate and a slag containing a large proportion of the iron and a gas high in sulfur dioxide. The cobalt is removed from the discharged molten matte, for separate recovery. This may be through its conversion to chloride by reaction of the liquid sulfides with gaseous chlorine or by solvent extraction, using a molten salt mixture of sodium and nickel chlorides. The thus cleansed molten matte may then be fire refined to metallic nickel in a bottom-blown, non-rotary converter which is sealed and tiltable, using gas-protected injectors to blow commercial oxygen through the matte or metal from below the liquid surface, employing hydrocarbon gas shielding of the oxygen during the final stages of the blow.

The invention may also be advantageously employed in treating copper-nickel or cupro-nickel concentrates according to the invention to form a metallic copper-nickel alloy as the metallic phase. The alloy may be dissolved by aqueous chlorination and the dissolved metal chlorides subjected to solvent extraction for copper and nickel isolation and, pure copper and nickel may be recovered from the aqueous extracts by electrowinning.

In converting lead sulfide concentrates into lead, according to the invention, the following procedure may be employed. The lead concentrates are dropped continuously onto the surface of a slag covered molten lead bath in a sealed converter, of the type described herein, which is continuously blown with commercial oxygen employing submerged fluid-protected injectors. There is thus produced continuously a substantially zinc-free bullion and a sulfur dioxide-rich gas. The slag produced is continuously fumed in the converter by injection of carbonaceous material for the production of a low lead and low zinc-containing slag. The lead in the converter gas particulate matter may be continuously recycled.

Certain principles of the invention may be applied to producing copper, nickel, or cupro-nickel from their substantially iron-free sulfides. For example, there may be introduced below the surface of the molten bath of the sulfides contained in a tiltable sealed bottom-blown non-rotary converter an oxygen-rich gas having an oxygen content sufficient for autogenous conversion of the sulfide to metal. According to the invention, the gas is blown through the bath by means of appropriately positioned, fluid-protected injectors extending through the refractory wall of the converter to openings in its lower part below the bath surface. Pneumatic bath turbulence is thus created for effective interphase contact. The gas flow rates are regulated so that bath temperature is maintained at uniform controlled levels effective for high reaction rates between oxygen and sulfur and so that the quantity of oxygen reacted is only about the stoichiometric amount necessary to convert substantially all the sulfur present in the bath to sulfur dioxide. Desirably, the protective fluid for the oxygen injectors is sulfur dioxide or water or both, until the sulfur content of the bath is less than about 5 percent, and then a hydrocarbon gas may be employed as shielding fluid for the remainder of the blow.

GASES

The term "commercial oxygen" is defined as a gas normally having more than 90 percent free oxygen and it is preferred to employ commercial oxygen. The use of such oxygen permits, in addition to $SO_2$-rich gas production, furnace operation at temperatures higher than conventional, with accompanying kinetic and operating advantages in high reaction rates and in control of matte and slag fluidity, provided the metal injectors and surrounding refractories are protected, as taught herein, from the increased temperatures. With some concentrates, an autogenous process may be carried out using oxygen-enriched air, containing down to as little as 40 percent oxygen, although introducing such large proportions of nitrogen into the system may be undesirable for environmental and other reasons. This is a higher oxygen level than normally tolerated by the standard Pierce-Smith converter, which suffers from over-oxidation and over-heating near the tuyeres and from relatively poor interphase contact, poor temperature distribution, and limited control of oxygen activity.

In the applicants' process, the furnace off-gas normally has a sulfur dioxide content over 70 percent dry basis and preferably over 80 percent, and is substantially free of nitrogen oxides. Converter off-gas is passed through steam raising boilers for power generation purposes. It is then suitably cleansed of substantially all of its particulate matter content, and most of the copper, nickel or lead in the latter recycled to the process. The sulfur dioxide injected into the converting operation is normally recycled converter off-gas.

The amount of $SO_2$ added, as a protective fluid, or otherwise will range from about 0 to about 150 percent by volume of the oxygen, measured at standard normal temperature and pressure, that is at 0° C and one atmosphere of pressure. Water may be added as an atomized fog in an amount within the range from 0 up to 25 percent by weight of the oxygen. The water may be added in the oxygen stream, in a shielding gas stream, or both.

SLAG

A further advantage of the applicants' method and apparatus, with the flexible controls described, is the ability conferred to readily produce, when desired, ferrous silicate slags at higher than conventional temperatures, for example, over 1300° C and at higher than conventional silica contents, e.g. over 3 percent silica, with consequent lower than conventional copper, nickel or colbalt losses owing to the satisfactory fluidity of the slags, their low density and low ferric iron concentration.

PRODUCTS

The end product from copper sulfide concentrates may be a crude metal with a copper content of over 95 percent and an iron content of less than 0.2 percent, a sulfur content of less than 2 percent with a copper recovery of over 98 percent, or the process can produce a matte of over 75 percent copper, less than 1 percent iron and the balance sulfur and impurities, again with a copper recovery of over 98 percent. In the case of nickel, the end product may be a crude metal over 90 percent nickel, less than 1 percent iron, less than 5 percent sulfur for a nickel recovery of over 95 percent; or a matte of over 65 percent nickel, less than 5 percent iron with a cobalt recovery of over 75 percent. In either case the nickel recovery will be over 95 percent. In the case of lead, the end product will be a bullion of over 95 percent lead, less than 1 percent iron, less than 1 percent sulfur, with recovery of over 95 percent of the lead.

OXYGEN INJECTION

The submerged oxygen injection, employed by the applicants, for converting, involves blowing fluid protected oxygen-rich gas into a molten bath through the refractory wall of a converter below the liquid surface. In certain applications of the present invention, such fluid protection may be similar to the general Savard-Lee concept disclosed in French Pat. No. 1,450,718 (1966), which is hereby incorporated by reference. According to that concept, metal is refined, in batches, by blowing commercial oxygen into a molten bath through injectors extending through the refractory lining of a standard converter and having openings communicating with a lower part of the vessel beneath the metal surface. The injectors and surrounding refractories are protected, by surrounding the oxygen stream with a shielding hydrocarbon.

Contrariwise, for continuous converting of sulfide concentrates, in their special converter, the applicants normally prefer to employ the non-combustible gas, sulfur dioxide, as protective fluid. Also, when desirable for additional cooling purposes, the applicants may use atomized water in the central oxygen stream; also, atomized water may be introduced into a shielding fluid. In appropriate circumstances, either sulfur dioxide or atomized water, or both, is introduced into the oxygen stream as an alternative or supplement to their use in a surrounding shielding fluid. The oxygen may be blown in a direction from substantially horizontal to vertically upward.

The preferred process of the invention has been described as a continuous process made up of an integrated combination of steps and control features providing the special results described. Such combination includes, for example, the continuous process in which the metal-rich phase and the slag phase flow countercurrently, the slag and gas phases flow concurrently, and there are sequential stage converting and slag cleaning steps and, in which the vessel is oscillated. Some of these and other expedients of the preferred process are in themselves new and can be employed without other aspects. For instance, using submerged oxygen injection as described might be employed with other continuous slag cleaning expedients. Likewise, the slag scavenging or deconverting stage, as described, could also be applied to a molten slag bath resulting from other than the applicants' converting stage. While oscillation of the vessel provides preferred effects, acceptable results could be achieved without oscillation of the vessel.

The applicants' apparatus can be modified for use in discontinuous copper or nickel matte converting or fire refining operations, e.g. in a bottom blown non-rotary tiltable sealed converter, using fluid protected injectors to blow commercial oxygen directed upwardly or substantially horizontally, i.e. less than about 10° below the horizontal through the matte or metal from below the liquid surface. The applicants' apparatus can be also modified for continuous iron-making and for the continuous oxygen converting of pig-iron into steel.

The present invention meets the need for a simple, flexible, economic continuous converting process with a superior capability for environmental conservation which is lacking in prior art proposals. Losses of value metals incurred by usage of the novel continuous single furnace unit are less than half those associated with conventional pyrometallurgical practice. Also, the cost of process off-gas treatment for sulfur fixation — either as iron sulfide or as elemental sulfur — is less than half that of similar fixation of sulfur in the off-gases from conventional practice. A main target of the applicants' invention is maximum utilization of the ore within boundary limits imposed by the market place on which the prior art fails to focus adequately. The use of applicants' method and apparatus permits simultaneously increased unit metal production capacity, decreased metal production costs, increased recovery of valuable components of the ore, and decreased environmental degradation.

Specific examples of preferred procedures will now be given to illustrate the invention in more detail.

EXAMPLE 1

One thousand metric tons per day of copper sulfide concentrates analyzing 28 percent Cu, 28 percent Fe, 30 percent S, 7 Percent $SiO_2$ (dry basis) and containing 1 percent water, are continously stage fed into a 6 meter × 36 meter converter constructed and operated in the manner indicated for FIG. 1 are flash converted in about 1330° C with 320 tons per day of flux analyzing 78 percent $SiO_2$ (dry basis) and containing 5 percent water, and 280 tons per day of commercial oxygen analyzing 98 percent $O_2$, 2 percent argon. The rates of both oxygen and concentrate introduction are judiciously controlled at the several vortex spray entries, the ratio of oxygen mixed with the concentrate introduced progressively from minimal at the entry closest to the slag scavenging region, to a maximum at the feed entry closest to the metallic copper producing region. Water in the additional amount of 50 tons per day is introduced into the converter atmosphere for temperature control purpose. The molten matte so produced is blown in controlled stages at about 1330° C by injection of 135 tons per day of commercial oxygen and 320 tons per day of sulfur dioxide as surrounding shielding gas and progressively oxidized to metallic copper in a controlled sequence of steps. 284 tons per day of crude copper analyzing 98 percent Cu, 0.1 percent Fe, 1 percent S are continuously discharged from the converter as indicated on FIG. 1. This product contains about 99 percent of the copper in the sulfide concentrate fed into the converter. The molten slag produced by these operations is scavenged at about 1330° C by injection of 50 tons per day of a mixture of subbituminous coal, sulfur dioxide and oxygen is approximately a 5:4:1 weight ratio. Concommitantly the slag is washed by a shower of 25 tons per day of iron sulfide, following which the slag is settled in a calm pool and then continuously discharged at the rate of 800 tons per day in a stream analyzing 0.2 percent Cu, 35 percent Fe, 40 percent $SiO_2$. This product contains substantially all of the iron in the sulfide concentrates fed to the converter. The gas from the conversion operations is discharged continuously at a temperature of about 1330° C and at a rate of 645 tons per day in a stream analyzing 88 percent $SO_2$, 9 percent $CO_2$, 2 percent Ar, 1 percent $O_2$ (dry basis). This product contains over 90 percent of the sulfur in the sulfide concentrate fed to the converter and is free of nitrogen oxides. The hot gas flows to boilers for steam raising and power generation and then to dry electrostatic precipitators, wet scrubbers and/or bag filters for dust recovery. Controlled fractions of the collected particulate material and cleaned gas are bled out for appropriate treatment and disposal, and the balance is recycled to the converter.

EXAMPLE 2

A pentlandite concentrate analyzing 15 percent Ni, 0.6 percent Co, 40 percent Fe, 30 percent S, 10 percent $SiO_2$, is treated in the applicants' continuous oxygen converter for production of matte analyzing over 65 percent Ni, and containing over 96 percent of the nickel and over 75 percent of the cobalt in the concentrate, of a slag containing over 95 percent of the iron in concentrate, and of a gas analyzing over 75 percent $SO_2$ (dry basis) and containing over 75 percent of the sulfur in the concentrate. The cobalt is removed from the discharged molten matte, for separate recovery, through its conversion to chloride by known precedures, e.g. by reaction of the liquid sulfides with gaseous chlorine or by solvent extraction using a molten salt mixture of sodium and nickel chlorides. If desired, the thus cleansed molten matte is then fire refined to metallic nickel in a bottom blown non-rotary converter which is sealed and tiltable, using gas protected injectors to blow commercial oxygen directed upwardly through the matte or metal from below the liquid surface, employing hydrocarbon gas shielding of the oxygen during the final stages of the blow.

In the case of nickel, there can be produced anything from nickel-rich matte, e.g. nickel sulfide containing more than 65 percent nickel and less than 5 percent iron and in which most of the cobalt in furnace feed is recovered, to crude nickel metal containing less than 5 percent sulfur and less than 1 percent iron.

EXAMPLE 3

A copper-nickel concentrate of the following analysis is treated in a continuous oxygen converter similar to that described herein and shown in FIGS. 1 and 2: 16 percent copper, 4 percent nickel, 32 percent iron, 27 percent sulfur and 10 percent silica. There is produced (a) metallic copper-nickel alloy analyzing over 98 percent combined copper and nickel and less than 2 percent combined iron and sulfur and containing over 98 percent of the combined copper and nickel in the sulfide concentrate, (b) a slag containing over 98 percent of the iron in the sulfide concentrate, and (c) a gas analyzing over 80 percent sulfur dioxide (dry basis) and containing over 90 percent of the sulfur in the sulfide concentrate fed to the converter. Only when the copper in the concentrate amounts to over about 70 percent of the combined copper-nickel content, will a metallic phase separate from a sink the matte during the converting operation.

The metallic copper-nickel alloy product is dissolved by aqueous chlorination, the dissolved metal chlorides are subjected to solvent extraction for copper and nickel isolation, and pure copper and nickel metals are recovered from the aqueous extracts by electrowinning.

EXAMPLE 4

Lead concentrate, analyzing 72 percent lead, 3 percent zinc and 17 percent sulfur and fluxes are introduced continuously into the converter as plus 4 mesh galena pellets, to prevent gas or slag suspension of the particulate lead sulfide containing material, and dropped on top of a slag covered lead bath which is bottom blown with oxygen employing fluid-protected injectors for production of a substantially zinc-free lead bullion analyzing over 95 percent lead and less than 1 percent sulfur, and containing over 95 percent of the lead in the concentrate, and a gas analyzing over 70 percent sulfur dioxide (dry basis) and containing over 90 percent of the sulfur in the concentrate. The slag produced is continuously fumed in the converter, by coal injection, for lead and zinc recovery, and lead in the converter gas particulate matter is recycled.

We claim:
1. A process for producing fire-refined metallic copper, nickel, copper-nickel or cobalt-nickel from their sulfides, characterized in that
   a. a molten substantially iron-free metal sulfide bath is established in a tiltable non-rotary sealed refractory-lined converter;
   b. oxygen in gas concentrations and amounts effective to achieve bath temperature levels required for high reaction rates in directed upwardly in said molten bath through several subsurface injectors until the overall quantity of oxygen reacted therewith is about the stoichiometric amount required to convert substantially all of the sulfur present in the bath to sulfur dioxide; and
   c. sulfur dioxide is introduced through said sub-surface injectors as shielding fluid surrounding the oxygen in regulated amounts effective for protecting the injectors and surrounding refractories until the sulfur content of the molten bath is required to less than about 5 percent, at which time the sulfur dioxide is replaced with hydrocarbon gas.

* * * * *

UNITED STATES PATENT AND TRADEMARK OFFICE
CERTIFICATE OF CORRECTION

PATENT NO. : 3,990,889
DATED : November 9, 1976
INVENTOR(S) : PAUL E. QUENEAU, et al.

It is certified that error appears in the above-identified patent and that said Letters Patent are hereby corrected as shown below:

```
Column  4, line 29, "with its" should be -- with all its --;
Column  5, line  9, "slowing" should be -- slowly --;
Column  5, line 55, "slag" should be -- slag S --;
Column  6, line  3, "toard" should be -- toward --;
Column  6, line 16, "flow" should be -- flows --;
Column  6, line 23, "means" should be -- mass --;
Column  6, line 47, "bringing" should be -- bringing about --;
Column  7, line 45, "1300°" should be -- 1300°C --;
Column  7, line 48, "scavening" should be -- scavenging --;
Column  8, line 51, "(Pco/Pco)" should be -- $(Pco_2/Pco)$ --;
Column  9, line 22, "135°C" should be -- $1350°C$ --;
Column  9, line 23, "(Pco/Pco)" should be -- $(Pco_2/Pco)$ --;
Column 10, line 11, "Typical" should be -- Typical preferred --;
Column 10, line 66, "sulfide" should be --sulfides --;
Column 11, line 64, "3" should be -- 39 --;
Column 11, line 66, "colbalt" should be -- cobalt --;
Column 13, line 43, "in" should be -- at --;
Column 13, line 50, "duced" should be -- duced increasing --;
Column 13, line 55, "purpose" should be -- purposes --;
Column 13, line 65, "into" should be -- to --;
Column 13, line 68, "is" should be -- in --;
Column 14, line 27, "96" should be -- 95 --;
Column 14, line 34, "prece-" should be -- proce- --;
Column 15, line  1, "a sink" should be -- and sink below --;
```

UNITED STATES PATENT OFFICE
CERTIFICATE OF CORRECTION

Patent No. 3,990,889            Dated November 9, 1976

Inventor(s) Paul E. Queneau, et al.

It is certified that error appears in the above-identified patent and that said Letters Patent are hereby corrected as shown below:

Column 16, line 12, "in" second occurrence should read -- into --.

Column 16, line 22, "required" should read -- reduced --.

Signed and Sealed this twelfth Day of July 1977

[SEAL]

Attest:

RUTH C. MASON
*Attesting Officer*

C. MARSHALL DANN
*Commissioner of Patents and Trademarks*